No. 741,594. PATENTED OCT. 13, 1903.
S. SCHLACHTER.
GRAVE FILLER.
APPLICATION FILED JUNE 26, 1903.
NO MODEL.

Witnesses
P. H. Nagle
L. Bouville

Inventor
Siegmund Schlachter.
By Diedersheim & Fairbanks.
Attorneys

No. 741,594. Patented October 13, 1903.

UNITED STATES PATENT OFFICE.

SIEGMUND SCHLACHTER, OF PHILADELPHIA, PENNSYLVANIA, ASSIGNOR OF ONE-THIRD TO JOSEPH MORWITZ, OF PHILADELPHIA, PENNSYLVANIA.

GRAVE-FILLER.

SPECIFICATION forming part of Letters Patent No. 741,594, dated October 13, 1903.

Application filed June 26, 1903. Serial No. 163,229. (No model.)

*To all whom it may concern:*

Be it known that I, SIEGMUND SCHLACHTER, a citizen of the United States, residing in the city and county of Philadelphia, State of Pennsylvania, have invented a new and useful Improvement in Grave-Fillers, of which the following is a specification.

My invention relates to a receptacle for temporarily holding a mass of earth ordinarily intended to be returned to the place from which it was taken or removed to a place adjacent thereto. It is particularly adapted to be used in cemeteries and the like to receive the earth removed in digging a grave and to readily replace such earth after the interment.

It consists of a box, preferably wheeled and provided with handles and a gate for dumping its contents.

It also consists of a box provided with legs adjustable in height, whereby the box may be supported over a finished grave without injury to its appearance.

It further consists of novel features of construction, all as will be hereinafter fully set forth.

Figure 1:
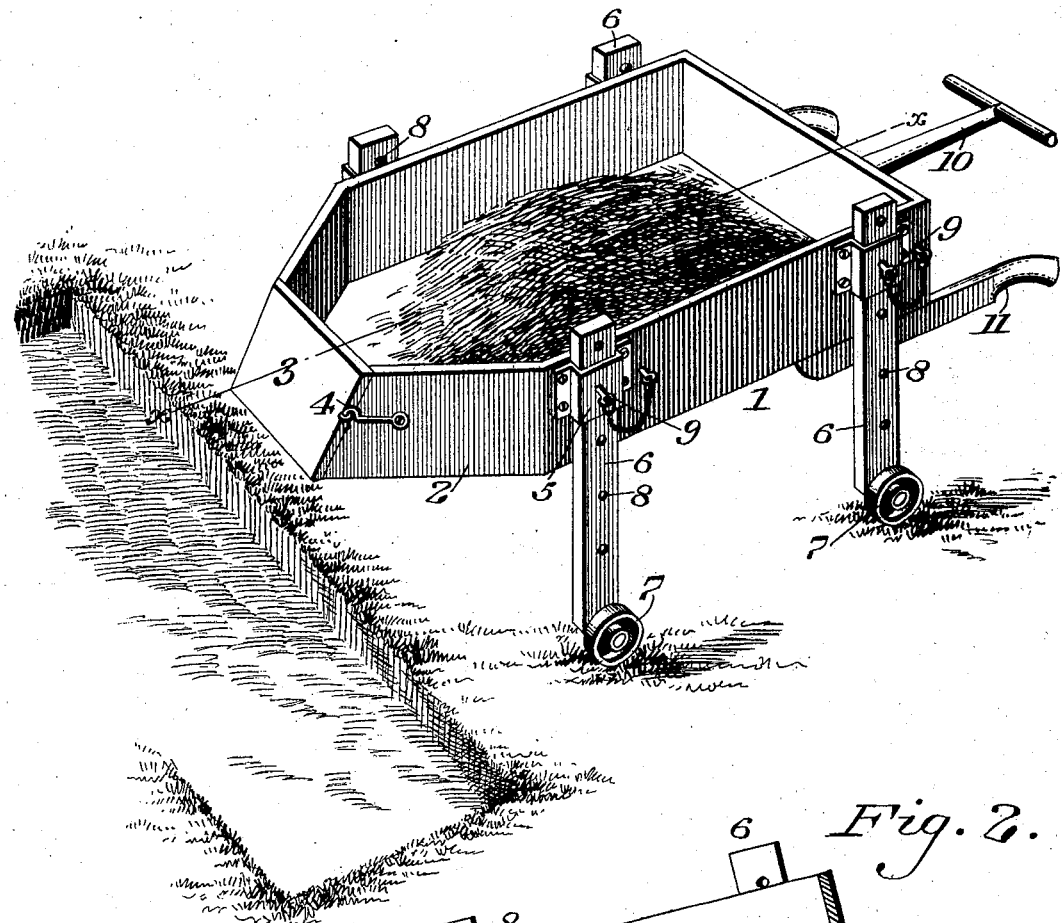
Figure 2:
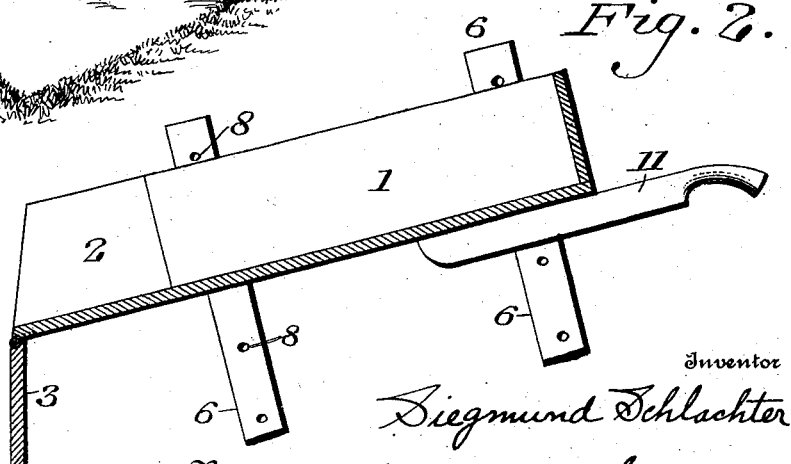

Figure 1 represents a perspective view of a receptacle embodying my invention. Fig. 2 represents a vertical section through the lines *x x*, Fig. 1, but showing the receptacle in its dumping position.

Similar numerals of reference indicate corresponding parts in the figures.

Referring to the drawings, 1 designates the body of a box formed with a contracted front end 2, closed by a gate 3, hinged at its lower side and normally held in its closed position by hooks 4.

Secured to the sides of the body 1 are sockets 5, through which pass legs 6, having casters or wheels 7 at their feet. Each leg is pierced with a longitudinal series of holes 8, each adapted to receive a pin 9, by which the leg may be secured in the socket 5 at different heights.

A propelling-handle 10 and dumping-handles 11 are preferably attached to the rear of the body 1.

The operation is as follows: The receptacle may be placed, as shown, adjacent a grave to be opened, the earth therefrom being thrown into the box. The box may then be wheeled away to a convenient distance, or it may be left *in situ*, being covered, if desired, with a suitable pall or a mass of foliage. After the mourners have departed it is only necessary to return the box or to remove the covering, when the gate 3 may be unlatched, the rear of the box elevated by means of the handles 11, and the earth quickly and quietly restored. When the box is raised on its legs 6, as shown, it may be placed either transversely or longitudinally over an adjoining raised grave without breaking it down or injuring any plants growing thereon.

Where the ground is smooth, the box may be set at a lower level for ease in filling, or, if desired, the front portion of the box may be relatively lowered to facilitate dumping.

It is evident that either the handle 10 or those marked 11 may be omitted or their position changed, as desired. It is also evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. A grave-filler comprising a box suitably supported for dumping and having a contracted forward end provided with a gate.

2. A grave-filler comprising a dumping-box supported on wheeled legs adjustable in height.

3. A grave-filler comprising a dumping-box supported on wheeled legs adjustable in height and provided with a handle.

4. A grave-filler comprising a box having a contracted forward end provided with a gate, wheeled supporting-legs adjustable in height and a handle at its rear end.

SIEGMUND SCHLACHTER.

Witnesses:
JOHN A. WIEDERSHEIM,
C. D. MCVAY.